United States Patent [19]

Robertson

[11] Patent Number: 5,417,131
[45] Date of Patent: *May 23, 1995

[54] TOOL HOLDER HAVING INTEGRAL WEDGE CLAMPING MECHANISM

[75] Inventor: Robert J. Robertson, Raleigh, N.C.

[73] Assignee: Kennametal Inc., Latrobe, Pa.

[*] Notice: The portion of the term of this patent subsequent to Aug. 28, 2007 has been disclaimed.

[21] Appl. No.: 142,885

[22] Filed: Oct. 25, 1993

Related U.S. Application Data

[60] Continuation of Ser. No. 908,657, Jul. 2, 1992, Pat. No. 5,255,582, which is a continuation of Ser. No. 430,550, Nov. 1, 1989, abandoned, which is a division of Ser. No. 241,521, Sep. 7, 1988, Pat. No. 4,951,536.

[51] Int. Cl.$^6$ .............................................. B23B 29/04
[52] U.S. Cl. ....................................... 82/158; 82/160; 407/101
[58] Field of Search ................. 82/158, 159, 160, 161; 403/370, 374; 407/41, 46, 49, 101, 108, 73, 75

[56] References Cited

U.S. PATENT DOCUMENTS

| | | | |
|---|---|---|---|
| 2,547,789 | 4/1951 | Skeel | 403/370 |
| 3,489,042 | 1/1970 | Papp . | |
| 4,057,294 | 11/1977 | Krekeler | 407/108 |

OTHER PUBLICATIONS

Sandvik brochure entitled "Block Tool System—Quick Tool Change—BT25".

*Primary Examiner*—Jack W. Lavinder
*Attorney, Agent, or Firm*—James G. Porcelli

[57] ABSTRACT

The present invention entails a tool holder adapted to be inserted within the tool slot of a lathe turret. The tool holder includes a detachable cutting unit and a clamping unit. Forming a part of the clamping unit is a pair of wedge blocks disposed within wedge cavities formed within the clamping unit. The wedge blocks are movable via screws from an inner relaxed or disengaged position to an outer position where the wedge blocks engage the tool slot and through a wedging action function to secure the tool holder within the tool slot of the lathe turret.

14 Claims, 3 Drawing Sheets

TOOL HOLDER HAVING INTEGRAL WEDGE CLAMPING MECHANISM

This is a continuation of application Ser. No. 07/908,657, filed on Jul. 2, 1992, to be issued on Oct. 26, 1993, as U.S. Pat. No. 5,255,582, which is a continuation of application Ser. No. 07/430,550, filed on Nov. 1, 1989, now abandoned, which is a divisional of application Ser. No. 07/241,521, filed on Sep. 7, 1988, issued as U.S. Pat. No. 4,951,536.

FIELD OF THE INVENTION

The present invention relates to tool holders, and more particularly to tool holders and clamping mechanisms for securing the tool holder within a lathe turret tool slot.

BACKGROUND OF THE INVENTION

Conventional lathe turrets are designed with a plurality of tool holder slots capable of receiving tool holders needed to perform a variety of metal working operations such as turning, shaping, grooving and threading. When the lathe is set up with proper tools, it can be programmed to perform a variety of metal working operations in a predefined sequence without human intervention between metal working operations to change tools.

The tool holders used in connection with a lathe turret generally include a support bar which is mounted in the tool holder slot in side-by-side relationship with a large external wedge. The wedge includes an inclined surface that engages one corner of the support bar. A screw extends through the wedge into a threaded opening in the bottom of the tool holder slot. When the screw is tightened, the inclined surface of the wedge exerts a downward and sideward force to the support bar effectively wedging the tool holder into the tool holder slot.

Prior art tool holders and the clamping mechanisms used with lathe turrets have numerous disadvantages. Because the prior art tool holder is assymmetrically disposed in the tool holder slot, the tool holder is capable of receiving only right-handed or left-handed cutting units, but not both. Further, the external wedge used for clamping the tool holder into the tool holder slot consumes so much space that it has not previously been possible to incorporate quick-change receptacles into tool holders used in connection with lathe turrets.

An additional problem encountered with prior art lathe turret tool holders is that in some instances the critical x-dimension programming point was not consistent with the original tooling. Thus, there was always a need to reprogram current productions parts when converting from the original tooling to replacement tooling.

SUMMARY AND OBJECTS OF THE INVENTION

The present invention entails an integral tool holder and clamping mechanism for a lathe turret that overcomes the disadvantages of prior art designs. Wedge blocks including exposed locking surfaces are reciprocally movable within wedge cavities formed in a clamping unit. First and second threaded openings are formed in the wedge blocks and clamping unit respectively in axial alignment with one another. A differential screw is threaded into the first and second threaded openings. When the differential screw is rotated in a first direction, each wedge block moves from a relaxed or disengaged position towards an engaged position. At the same time, due to the angular disposition of the axis of the differential screw with respect to the wall of the tool holder slot, the exposed locking surface of the wedge block moves progressively outwardly into engagement with the wall of the tool holder slot to secure the clamping unit.

By eliminating external wedges associated with the prior art devices, it is possible to center the cutting unit in the tool holder slot. The result is a neutral clamping unit capable of accepting both right-handed and left-handed cutting units. This greatly reduces the time needed to set up the lathe turret when a new production part is ordered.

Another aspect of the invention is that more efficient use of the tool holder slot is obtained. Space once occupied by the external wedge in prior art devices is used in the present invention to incorporate a quick-change systems for mounting the cutting unit on the clamping unit.

Accordingly, it is a primary object of the present invention to provide a clamping mechanism for lathe turret tool holders which will allow incorporation of quick change systems into turret lathe tool holder slots.

Another object of the present invention is to provide a clamping mechanism of the type described above which will eliminate the need for external wedges to secure the tool holder within the tool holder slot.

Still another object of the present invention is to provide a clamping mechanism for lathe turret tool holders which are symmetrically arranged within the tool holder slot so as to accept both right-handed and left-handed cutting units.

Another object of the present invention is to provide an integral tool holder and clamping mechanism for insertion into a tool slot of a lathe turret wherein the tool holder includes an integral movable wedge structure that is movable form an inner disengaged position to an outer engaged position where the wedge structure engages an adjacent wall of the tool slot and effectively "wedges" the tool holder between opposed side walls of the tool slot.

Other objects and advantages of the present invention will become apparent and obvious from a study of the following description and the accompanying drawings which are merely illustrative of such invention.

DESCRIPTION OF THE INVENTION

Figure 1:
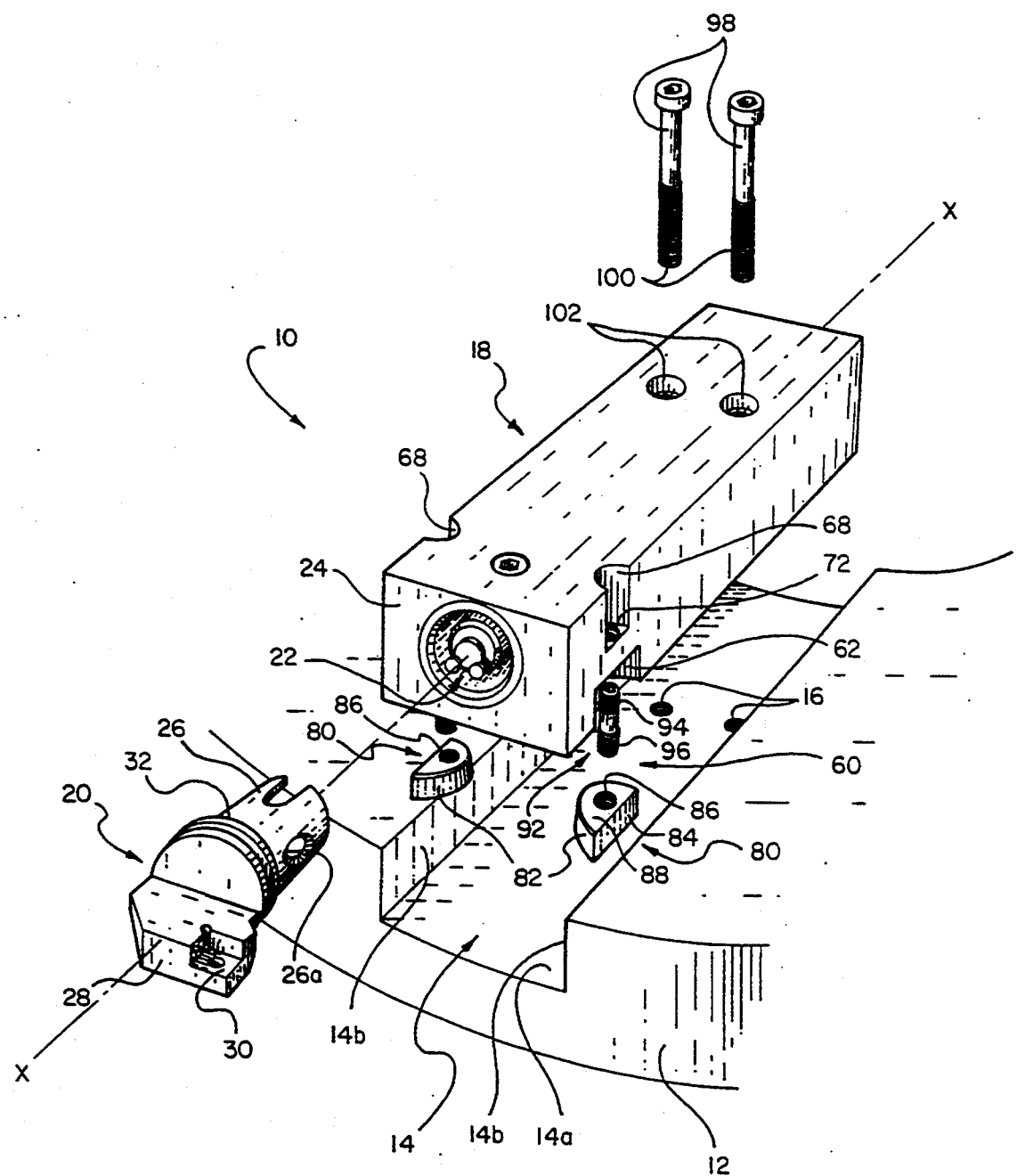
FIG. 1 is an exploded perspective view showing the tool holder of the present invention overlying a tool slot of a lathe turret.
Figure 2:
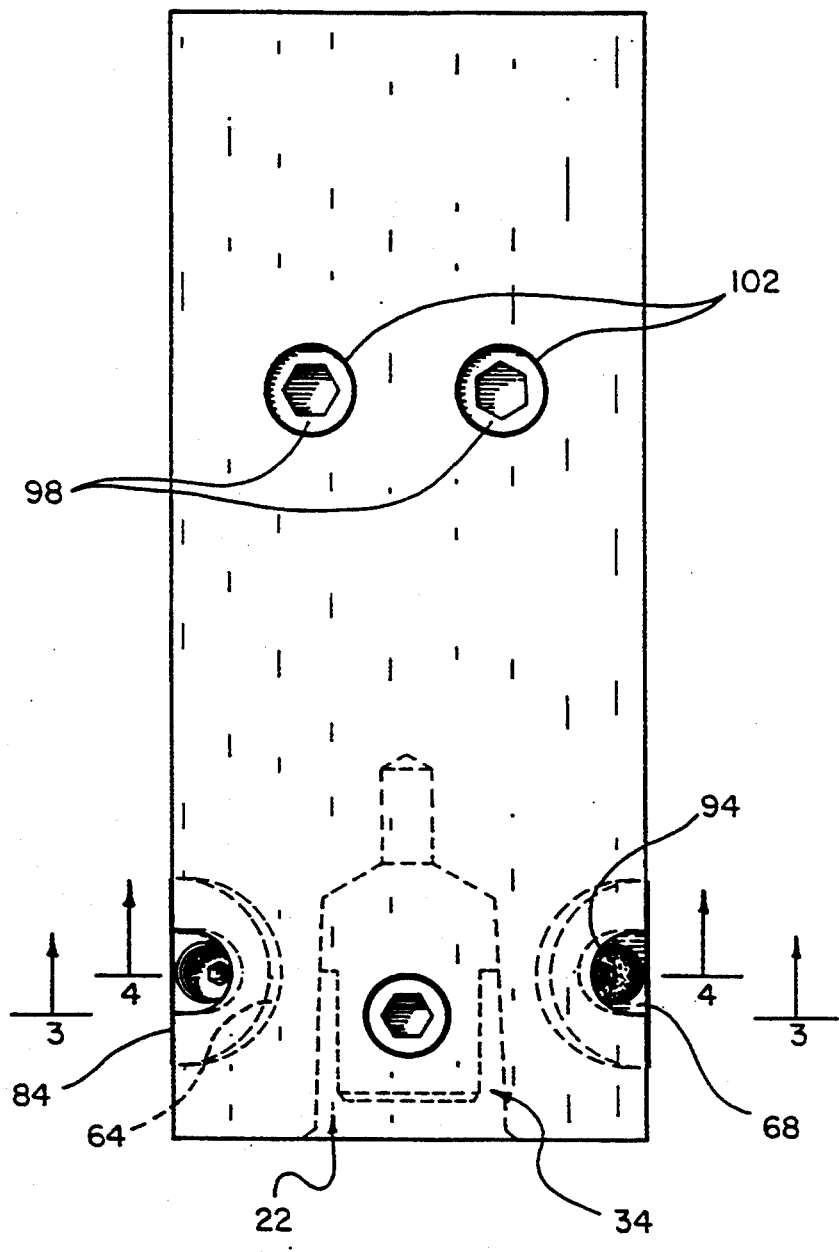
FIG. 2 is a top plan view of the clamping unit which forms a part of the tool holder of the present invention.

Referring now to the drawings, the tool holder of the present invention is shown therein and indicated generally by the numeral 10 (FIG. 1). Tool holder 10 is designed to be used in connection with a lathe turret 12 adapted to hold a plurality of diverse tools. Lathe turret 12 includes one or more tool holder slots 14 which include a bottom 14a and parallel side walls 14b. One or more threaded openings 16 are provided in bottom 14a of the tool holder slot for securing tool holder 10 therein.

Tool holder 10 includes a clamping unit 18 and a cutting unit 20. Clamping unit 18 is made from 4340 steel or an equivalent which is heat treated to obtain a hardness of between 44 and 48 on the Rockwell C scale. The clamping unit 18 is generally symmetrical about its longitudinal axis X-X. A tool shank bore 22 adapted to mount the cutting unit 20 is formed in a forwardly facing surface 24 of the clamping unit 18 and is also disposed symmetrically about longitudinal axis X-X.

Cutting unit 20 includes a forward portion 28 formed with a tool receiving pocket 30. A conventional shim, indexable tool insert, and locking pin (not shown) can be received within pocket 30. A rearwardly facing surface 32 is designed for abutment with the forwardly facing surface 24 of the clamping unit 18 on which the cutting unit 20 is to be mounted. A cylindrical shank 26 having two diametrically opposed apertures 26a extends rearwardly from the rearwardly facing surface 32 and is adapted to be received in the tool shank bore 22 of the clamping unit 18.

Figure 3:
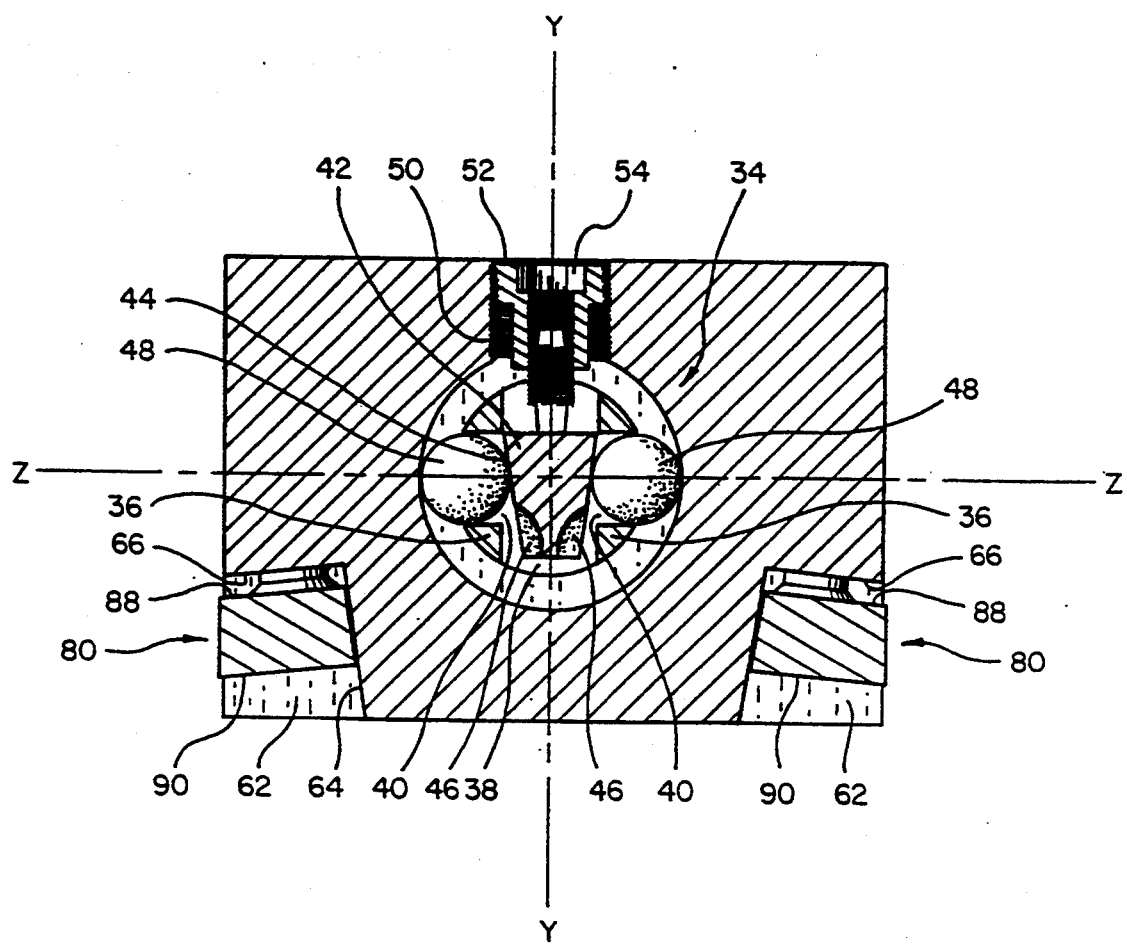
FIG. 3 is a cross sectional view of the clamping unit taken along the lines 3—3 of FIG. 2.

Contained within tool shank bore 22 is a ball lock clamping mechanism 34 for locking the cutting unit 20 within bore 22 (See FIG. 3). The ball lock clamping mechanism 34 includes a stub member 36 symmetrically disposed about the longitudinal axis X-X. A passage way 38 is formed in the stub member 36 which extends transversely to the longitudinal axis X-X along the vertical axis Y-Y. Intersecting the passage way 38 are two diametrically opposed apertures 40 in the stub member 36 which also extend transversely to the longitudinal axis X-X along the transverse axis Z-Z.

A detent ball 48 is contained in each aperture and is driven into engagement with the shank of the cutting unit 20 by a reciprocally movable actuating member 42. Actuating member 42 includes spherical depressions 46 for permitting the detent balls 42 to withdraw into the stub member 36. The actuating member 42 is moved linearly along the vertical axis Y-Y by a connecting member 52 which is threaded into a threaded opening 50 in the clamping unit 18. On one end of the connecting member 52 there is an internal hexagon 54 designed to receive an Allen key wrench for turning the connecting member 52.

When the connecting member 52 is rotated in a first direction, the detent balls 48 are forced out of the spherical depressions 46 and onto the concave ramps 44. Once the locking elements are moved onto the ramps 44, further rotation of the connecting member 52 will urge the detent balls 48 radially outwardly along the transverse axis Z-Z through apertures 40 and into engagement with the shank 26 of the cutting unit 20. The detent balls 48 are released by rotating the connecting member 52 in a second direction until the spherical depressions 46 are brought into alignment with the diametrically opposed apertures 40.

The design and construction of ball lock clamping mechanisms are well known to those skilled in the art. Therefore, a more detailed discussion of the same has been omitted for the sake of brevity. A more complete description of the ball lock clamping mechanism is contained in U.S. Pat. Nos. 4,736,659 and 4,723,877 which are incorporated herein by reference.

Figure 4:
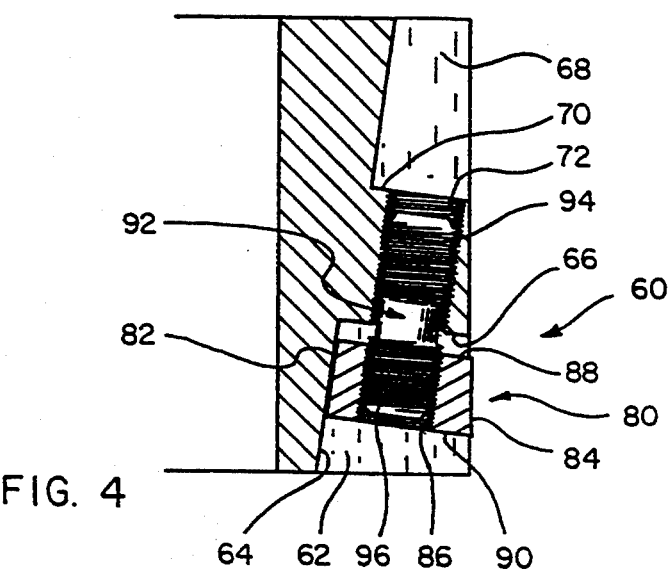
FIG. 4 is a partial cross sectional view of the clamping unit taken along the lines 4—4 of FIG. 2.

Clamping unit 18 is itself secured within the tool holder slot 14 of the lathe turret 12 by means of an integral wedge clamp mechanism indicated generally at 60 (FIGS. 1 & 4). The integral wedge clamp mechanism comprises in part two wedge cavities 62 symmetrically disposed about longitudinal axis X-X. In the preferred embodiment of the invention, each wedge cavity 62 is semicircular in form. A rear arcuate bearing wall 64 forms a part of the wedge cavity 62 and tapers outwardly as it extends upwardly from the bottom of the clamping unit 18. A top wall 66 also forms a part of the wedge cavity 62 and extends perpendicularly from the rear arcuate bearing wall 64 to respective side walls of the clamping unit 18.

A pair of screw recesses 68 are formed in the clamping unit directly above respective wedge cavities 62. A threaded bore 72 extends through the clamping unit 18 from the bottom wall 70 of the recess 68 to the top wall 66 of the wedge cavity 62. The axis of the threaded bore 72 is disposed at an angle with respect to the vertical axis Y-Y and is parallel to the rear arcuate wall 64 of the wedge cavity 62. Preferably, the angle is between two and ten degrees and more preferably between five and seven degrees.

Disposed within each wedge cavity 62 there is a semicircular wedge block 80 made of a 4140 or 4340 steel which is heat treated to obtain a hardness of between 40 and 45 on the Rockwell C scale. The wedge block 80 includes an inwardly facing surface 82 for abutting the rear arcuate bearing wall 64 of the wedge cavity 62 and an exposed, outwardly facing locking surface 84 for engaging the side wall of the tool slot 14 (FIG. 1). A threaded opening 86 extends through the wedge block 80 from the top 88 of the wedge block 80 to its bottom 90. Threaded opening 86 is in axial alignment with the threaded bore 72 in the clamping unit 18.

One end 94 of a differential wedge screw 92 is threaded into the threaded bore 72 formed in the clamping unit 18, while the opposite end 96 thereof is threaded into the wedge block 80. An internal hexagon adapted to receive an Allen key wrench is formed in the ends 94 and 96 of the differential wedge screw 92. When the differential screw 92 is rotated in one direction, the wedge block 80 is drawn upwardly into the narrow portion of the wedge cavity 62 as the screw 92 threads itself into openings 72 and 86. At the same time this is occurring, the locking surface 84 of the wedge block 80 is moved progressively outwardly into engagement with the side wall 14b of the tool holder slot 14 due to the angular disposition of the screw axis. The resulting compression of the wedge block 80 generates frictional locking forces which firmly secure the clamping unit 18 into the tool holder slot 14.

In the preferred embodiment of the invention, the wedge block 80 will be harder than the lathe turret 12 but not as hard as the clamping unit 18. As a result, the wedge block 80 will effectively "lock" itself to the side wall of the tool holder slot 14 while relative movement between the wedge block 80 and the clamping unit 18 is still obtainable. Any further tightening of the differential screw 92 beyond this point will cause the entire clamping unit 18 to be pulled downwardly into the tool holder slot 14.

To release the clamping unit 18, the differential screw 92 is simply rotated in the opposite direction to force the wedge block 80 into the broader region of the wedge cavity 62. For this reason, the differential screw 92 is preferred over conventional screws which are incapable of exerting a downward force on the wedge block 80.

To further secure the clamping unit 18 in the tool holder slot 14, one or more screws 98 having threaded ends 100 may be provided. Screws 98 extend through corresponding bores 102 in the clamping unit 18 and are threaded into openings 16 formed in the bottom tool holder slot 14.

From the foregoing specification and discussion, it is appreciated that the tool holder and integral clamping mechanism offer significant advantages over prior art designs. By integrally forming the wedging mechanism into the tool holder itself, it enables one to center the cutting unit in the tool holder slot. This enables the cutting unit to accept both right hand and left hand cutting units and greatly increases efficiency because it minimizes reprogramming and set up time when a new production run is instigated. Beyond that, the tool holder and integral clamping mechanism of the present invention entails a neat and compact design that can be easily and quickly installed into the tool slot of the lathe turret. This allows for applications of quick change cutting units in most conventional lathe turrets.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A tool holder for use in a lathe turret formed with a tool holder slot having a bottom and a pair of parallel side walls, said tool holder comprising:
    (a) a clamping unit insertable into the tool holder slot of said lathe turret, said clamping unit including:
        (i) a main body having a pair of side walls disposed adjacent to respective side walls in the tool holder slot; said main body being receivable in the tool holder slot such that the bottom surface locates against the bottom of the tool holder slot; and
        (ii) a clamping mechanism formed in the main body of the clamping unit for receiving and holding a cutting unit;
    (b) a wedge clamp mechanism integral with the clamping unit for securing the clamping unit in the tool holder slot, said wedge clamp mechanism including:
        (i) a wedge cavity formed in one of the side walls in the clamping unit and including a bearing wall inclined toward the adjacent side wall of the tool holder slot;
        (ii) a wedge block mounted within said wedge cavity for vertical movement between disengaged and engaged positions with the adjacent side wall of the tool holder slot, said wedge block including an inwardly facing surface slidably engaged with the bearing wall of the wedge cavity and a locking surface disposed in a plane parallel to the adjacent side wall of the tool holder slot frictionally engaged with the adjacent side wall of the tool holder slot when the wedge block is moved to the engaged position and the locking surface of said wedge block disengaged from the adjacent side wall of the tool holder slot when the wedge block is moved to the disengaged position; and
        (iii) a screw engaged with both the clamping unit and the wedge block for moving the wedge block along the bearing wall of the wedge cavity to the engaged position where the locking surface of the wedge block frictionally engages the adjacent side wall of the tool holder slot and secures the clamping unit within the tool holder slot wherein the screw applies a downwardly directed force to the clamping unit to locate the bottom surface of the clamping unit against the bottom of the tool holder slot.

2. The tool holder according to claim 1 wherein the screw extends through the clamping unit and has at least one threaded end engaged with a threaded opening found in the wedge block.

3. The tool holder according to claim 2 wherein the axis of the screw is disposed in a plane parallel to the bearing wall of the wedge cavity.

4. The tool holder according to claim 3 wherein the screw is a differential screw with two sets of threads and wherein the clamping unit has a threaded opening engaged with the one set of threads and the wedge block has a threaded opening engaged with the other set of threads such that rotation of the screw in one direction will urge the wedge block into the engaged position while rotation in the other direction will urge the wedge block into the disengaged position.

5. The tool holder according to claim 1 further including a additional wedge clamp mechanism disposed in the side wall of the clamping unit opposite the side wall adjacent to that of the first wedge clamp mechanism.

6. The tool holder according to claim 1 wherein the bearing wall of the wedge cavity and the back surface of the wedge block are arcuately shaped.

7. The tool holder according to claim 1 wherein the bearing wall inclines toward the adjacent side wall of the tool holder slot as the bearing wall extends upwardly and wherein the wedge moves upwardly and outwardly along the bearing wall as it moves towards the engaged position.

8. A tool holder for use in connection with a lathe turret formed with a tool holder slot having a bottom and parallel side walls, said tool holder comprising:
    (a) a clamping unit for receiving a cutting unit, said clamping unit having two side walls and a bottom surface receivable in the tool holder slot such that the bottom surface locates against the bottom of the tool holder slot;
    (b) a wedge cavity formed in one side wall of the clamping unit and having a bearing wall inclined towards an adjacent side wall of the tool holder slot;
    (c) a wedge block having an inwardly facing surface abutting the bearing wall of the wedge cavity and a locking surface for engaging the side wall of the tool holder slot, said wedge block being movable inwardly and outwardly with respect to the side walls of the clamping unit between a disengaged position and an engaged position with respect to the side wall of the tool holder slot; and
    (d) a screw extending through the clamping unit and operatively connected to the wedge block for vertically moving the wedge block within the wedge cavity from the disengaged position to the engaged position where the locking surface of the wedge block engages and locks against a side wall of the tool holder slot to secure the clamping unit within the tool holder slot.

9. The tool holder according to claim 8 wherein the axis of the screw is disposed parallel to the bearing wall of the wedge cavity.

10. The tool holder according to claim 9 wherein the screw is a differential screw with two sets of threads and wherein the clamping unit has a threaded opening engaged with the one set of threads and the wedge block has a threaded opening engaged with the other set of threads such that rotation of the screw in one direction will urge the wedge block into the engaged position while rotation in the other direction will urge the wedge block into the disengaged position.

11. The tool holder according to claim 8 further including an additional wedge block disposed in an opposite side wall of the clamping unit and an additional differential screw engaged with the second wedge block and the clamping unit for moving the second wedge block, between a disengaged position and an engaged position with respect to an adjacent side wall of the tool holder slot.

12. The tool holder according to claim 8 wherein the bearing wall of the wedge cavity and the back surface of the wedge block are arcuately shaped.

13. The tool holder according to claim 8 wherein the bearing wall inclines toward the adjacent side wall of the tool holder slot as the bearing wall extends upwardly and wherein the wedge moves upwardly and outwardly along the bearing wall as it moves towards the engaged position.

14. A tool holder for use in connection with a lathe turret formed with a tool holder slot having a bottom and parallel side walls, said tool holder comprising:
   (a) a clamping unit for receiving a cutting unit, said clamping unit including an upper portion and a lower portion having parallel side walls and a bottom surface, wherein the lower portion of the clamping unit is receivable in the tool holder slot such that the bottom surface locates against the bottom of the tool holder slot, and wherein the upper portion is confined within the parallel side walls of the lower portions;
   (b) a wedge cavity formed in one side wall of the clamping unit and having a bearing wall inclined towards an adjacent side wall of the tool holder slot;
   (c) a wedge block having an inwardly facing surface abutting the bearing surface of the wedge cavity and a locking surface for engaging the side wall of the tool holder slot, said wedge block being movable inwardly and outwardly with respect to the side walls of the clamping unit between a disengaged position and an engaged position with respect to the side wall of the tool holder slot; and
   (d) a screw extending through the clamping unit and operatively connected to the wedge block for vertically moving the wedge block within the wedge cavity from the disengaged position to the engaged position where the locking surface of the wedge block engages and locks against a side wall of the tool holder slot to secure the clamping unit within the tool holder slot.

* * * * *